US012615586B2

(12) United States Patent
Fischer et al.

(10) Patent No.: US 12,615,586 B2
(45) Date of Patent: Apr. 28, 2026

(54) WIRELESS AIRCRAFT COMMUNICATION SYSTEM

(71) Applicant: Cirrus Design Corporation, Duluth, MN (US)

(72) Inventors: Jeff Fischer, Duluth, MN (US); Brad Cyr, Duluth, MN (US); Doug Young, Duluth, MN (US)

(73) Assignee: Cirrus Design Corporation, Duluth, MN (US)

( * ) Notice: Subject to any disclaimer, the term of this patent is extended or adjusted under 35 U.S.C. 154(b) by 378 days.

(21) Appl. No.: 18/082,441

(22) Filed: Dec. 15, 2022

(65) Prior Publication Data

US 2023/0337124 A1 Oct. 19, 2023

Related U.S. Application Data

(60) Provisional application No. 63/427,602, filed on Nov. 23, 2022, provisional application No. 63/290,568, filed on Dec. 16, 2021.

(51) Int. Cl.
$H04W\ 84/06$ (2009.01)
$H04L\ 43/0811$ (2022.01)
(Continued)

(52) U.S. Cl.
CPC ......... *H04W 48/18* (2013.01); *H04L 43/0811* (2013.01); *H04W 76/10* (2018.02); *H04W 84/06* (2013.01)

(58) Field of Classification Search
None
See application file for complete search history.

(56) References Cited

U.S. PATENT DOCUMENTS 6,181,990 B1 1/2001 Grabowsky et al.
6,577,419 B1 6/2003 Hall et al.
(Continued)

FOREIGN PATENT DOCUMENTS

CN 105373115 A 3/2016
CN 107276975 A 10/2017
(Continued)

OTHER PUBLICATIONS

Airsync, AirSync Kit—Gen 2—with 1 year Entry Tier Service , Product Description Sheet, https://air-sync.com/products/airsync, (2020), 2 pp.

(Continued)

*Primary Examiner* — Benjamin Lamont
(74) *Attorney, Agent, or Firm* — Faegre Drinker Biddle & Reath LLP

(57) ABSTRACT

A system and method for controlling wireless communication between one or more on-aircraft communication networks, including a wireless cabin network, and a plurality of off-aircraft communication networks. A first communication module is configured for wireless communications with a first off-aircraft network, such as for example a network configured for high altitude communications. A second communication module is configured for wireless communications with a second off-aircraft network, such as for example a network configured for terrestrial communications. Availability of a data link between the second communication module and the second network is determined. When the data link is determined to be available, the second communication module couples one or more of the on-aircraft networks to the second network. When the data link is determined to be not available, the first communication module couples one or more of the on-aircraft networks to the first network.

16 Claims, 6 Drawing Sheets

(51) Int. Cl.
  *H04W 48/18*    (2009.01)
  *H04W 76/10*    (2018.01)

(56)    References Cited

U.S. PATENT DOCUMENTS

| | | | |
|---|---|---|---|
| 6,876,905 B2 | 4/2005 | Farley et al. | |
| 7,187,927 B1 | 3/2007 | Mitchell | |
| 7,436,322 B2 | 10/2008 | Crank | |
| 8,391,788 B1 | 3/2013 | Mazuk et al. | |
| 8,447,292 B2 * | 5/2013 | Chari | H01Q 9/32 |
| | | | 455/448 |
| 8,493,906 B1 | 7/2013 | Troxel et al. | |
| 9,191,053 B2 | 11/2015 | Ziarno et al. | |
| 9,202,318 B2 | 12/2015 | Batcheller et al. | |
| 9,327,600 B1 | 5/2016 | Nehmeh | |
| 10,084,529 B1 | 9/2018 | Riechers et al. | |
| 10,362,035 B1 | 7/2019 | Corbett | |
| 11,659,490 B2 | 5/2023 | Dondoneau et al. | |
| 11,762,383 B2 | 9/2023 | Murch et al. | |
| 12,124,258 B2 | 10/2024 | Murch et al. | |
| 2006/0030311 A1 | 2/2006 | Cruz et al. | |
| 2006/0040660 A1 | 2/2006 | Cruz et al. | |
| 2006/0217851 A1 | 9/2006 | McGuffin et al. | |
| 2007/0179689 A1 | 8/2007 | Soulie et al. | |
| 2007/0228214 A1 | 10/2007 | Horak | |
| 2007/0246610 A1 | 10/2007 | Rath et al. | |
| 2008/0119968 A1 | 5/2008 | Loda | |
| 2010/0256841 A1 | 10/2010 | Garrec et al. | |
| 2010/0273450 A1 | 10/2010 | Papineau et al. | |
| 2010/0291960 A1 | 11/2010 | Buga et al. | |
| 2011/0313614 A1 | 12/2011 | Hinnant et al. | |
| 2012/0029853 A1 | 2/2012 | Baumheinrich et al. | |
| 2012/0202430 A1 | 8/2012 | Jalali et al. | |
| 2015/0177737 A1 | 6/2015 | Jensen et al. | |
| 2015/0234387 A1 | 8/2015 | Mullan et al. | |
| 2016/0119052 A1 * | 4/2016 | Frerking | H04W 24/02 |
| | | | 455/431 |
| 2016/0205724 A1 | 7/2016 | Shi | |
| 2017/0043249 A1 | 2/2017 | Bartlett et al. | |
| 2017/0045884 A1 | 2/2017 | Kablaoui | |
| 2018/0027036 A1 | 1/2018 | Watson et al. | |
| 2018/0170575 A1 | 6/2018 | Ziarno | |
| 2018/0205658 A1 | 7/2018 | Sullivan | |
| 2018/0352512 A1 | 12/2018 | Kim et al. | |
| 2019/0045348 A1 | 2/2019 | Li et al. | |
| 2020/0028687 A1 | 1/2020 | Castet et al. | |
| 2020/0044692 A1 | 2/2020 | Sheffield | |
| 2020/0106888 A1 * | 4/2020 | Srinivasan | H04M 15/8061 |
| 2020/0196323 A1 | 6/2020 | Church et al. | |
| 2021/0136426 A1 | 5/2021 | Mirmirani | |
| 2021/0160755 A1 | 5/2021 | Dondoneau et al. | |
| 2021/0160781 A1 | 5/2021 | Dondoneau et al. | |
| 2021/0227363 A1 * | 7/2021 | Natwick | H04W 72/56 |
| 2021/0333792 A1 | 10/2021 | Murch et al. | |
| 2021/0409107 A1 | 12/2021 | Wiegner et al. | |
| 2022/0279383 A1 * | 9/2022 | Amend | H04W 28/082 |
| 2022/0338043 A1 * | 10/2022 | Kazmi | H04W 24/10 |
| 2022/0404824 A1 | 12/2022 | Murch et al. | |

| | | | |
|---|---|---|---|
| 2023/0198608 A1 | 6/2023 | Fischer et al. | |
| 2023/0254772 A1 | 8/2023 | Dondoneau et al. | |
| 2023/0384785 A1 | 11/2023 | Murch et al. | |

FOREIGN PATENT DOCUMENTS

| | | |
|---|---|---|
| EP | 2020764 A2 | 2/2009 |
| EP | 3772202 A1 | 2/2021 |
| WO | 01/30031 A1 | 4/2001 |
| WO | 2021/108571 A1 | 6/2021 |
| WO | 2021/108577 A1 | 6/2021 |

OTHER PUBLICATIONS

Appareo Gateways Overview, "Rugged Edge Computers for Mobile Equipment", Product Overview Sheet, www.appareo.com, 2 pp.
Appareo iot Gateway 270/370 Data Sheet, "Advanced Communication Edge Computer Model 608065-0000XX", Product Data Sheet, www.appareo.com/iot, (2019) 5 pp.
Appareo iot Gateway 300 Data Sheet, "Advanced communication computing platform for mobile equipment applications", Product Data Sheet, www.appareo.com, (2016-2017) 6 pp.
Avionica avRDC Remote Data Concentrator, Product Description Sheet, https://avionica.com/avrdc, 5 pp.
Bad Elf, "Bad Elf Wombat", Product Description Page, https://bad-elf.com/pages/wombat-piston, (2020) 7 pp.
European Search Report for EP Patent Application No. 21796772.8, Issued on Apr. 12, 2024, 10 pages.
Garmin, GDU 104X Installation Manual, Garmin Ltd., Jul. 2010, 70 pp.
International Preliminary Report on Patentability received for PCT Patent Application No. PCT/US20/62254, mailed on Jun. 9, 2022, 8 pages.
International Preliminary Report on Patentability received for PCT Patent Application No. PCT/US20/62260, mailed on Jun. 9, 2022, 12 pages.
International Preliminary Report on Patentability received for PCT Patent Application No. PCT/US22/53138, mailed on Jun. 27, 2024, 15 pages.
International Search Report and Written Opinion received for PCT Patent Application No. PCT/US22/53138, mailed on Apr. 12, 2023, 19 pages.
International Search Report and Written Opinion received for PCT Patent Application No. PCT/US20/62254, mailed on Feb. 9, 2021, 8 pages.
International Search Report and Written Opinion received for PCT Patent Application No. PCT/US20/62260, mailed on Feb. 12, 2021, 12 pages.
International Search Report and Written Opinion received for PCT Patent Application No. PCT/US2021/029309, mailed on Aug. 5, 2021, 12 pages.
Jelinskis et al., "Mobile Application Based Traffic Advisory System for General Aviation-Is It Possible?", 2015 Advances in Wireless and Optical Communications (RTUWO), 2015, 4 pages.
Pratt & Whitney, Digital Engine Services, "FAST(Trademark) Solution" Products and Service Sheet, https://www.pwc.ca/en/products-and-services/services/digital-engine-services/fast-solution, 5 pp.

* cited by examiner

220

221

WIRELESS AIRCRAFT COMMUNICATION SYSTEM

CROSS-REFERENCE TO RELATED APPLICATIONS

This application claims the benefit of U.S. Provisional Patent Application No. 63/290,568, filed Dec. 16, 2021, and U.S. Provisional Patent Application No. 63/427,602, filed Nov. 23, 2022, both of which are herein incorporated by reference in their entireties and for all purposes.

FIELD OF THE DISCLOSURE

The present disclosure generally relates to wireless communications, and more specifically, to connection management of wireless communications for aircraft.

BACKGROUND

Air travel industry demands have led to increased expectations for high-speed, in-flight internet. Travelers increasingly want to stay connected during flights at all levels. Not only do they want to stay connected, but travelers also want their connection to be reliable and fast. In this regard, better connectivity allows for more communication for travelers and with aircraft systems such as safety, communication, and tracking systems.

Various companies have tasked themselves with meeting these demands and have developed systems that promise faster speeds and wider application. Costs associated with these systems, however, vary widely and are often dependent upon how much the system is being used. Thus, equipping an aircraft with in-flight internet can be costly over the lifespan of an aircraft as travelers use in-flight internet during travel. In addition, some systems are more cost-effective than others.

SUMMARY

Disclosed herein are devices, systems, and methods for use in performing data transfers in which some data from an airborne network may transfer to an external network through a plurality of data links. Advantageously, principles disclosed herein are useful for mitigating data costs incurred during data transfers, and for enhancing in-flight data communication capabilities for passenger communications with networks off of the aircraft (e.g., with networks and users on the ground). In this regard, principles of the present disclosure can govern data and control connections between systems and/or system components depending on parameters about data links, such as for example availability, and a prioritization based on parameters such as for example costs of data links and associated networks.

Examples include an aircraft communication system for use in an aircraft including one or more on-aircraft communication networks, comprising a first communication module configured to establish communication with one or more external communication networks off the aircraft via one or more first module wireless data links; and a second communication module configured to establish communication with one or more external communication networks off the aircraft via one or more second module wireless data links. One or more connection detectors are configured to determine availability of the one or more first module wireless data links and availability of the one or more second module wireless data links. A connection manager is configured to:

store prioritization information associated with the one or more first module wireless data links and the one or more second module wireless data links; determine a priority data link of the available one or more first module wireless data links and the available one or more second module wireless data links based upon the prioritization information; when the priority data link is one of the one or more first module wireless data links, cause the first communication module to couple the one or more on-aircraft communication networks, via the priority data link of the first module wireless data links, to an associated external communication network; and when the priority data link is one of the one or more second module wireless data links, cause the second communication module to couple the one or more on-aircraft communication networks, via the priority data link of the second module wireless data links, to an associated external communication network.

In some embodiments of the aircraft communication system, at least one of the one or more first module data links is configured to establish wireless communication with a first external communication network; and at least one of the one or more second module data links is configured to establish wireless communication with a second external communication network, and wherein the second external communication network is different than the first external communication network.

In some embodiments of the aircraft communication system, the first communication module is configured to establish wireless communication with a first external communication network having a first cost basis; and the second communication module is configured to establish wireless communication with a second external communication network having a second cost basis, and wherein one of the first and second cost bases is less than the other.

In some embodiments of the aircraft communication system: the one or more on-aircraft communication networks is coupled to the first communication module; the communication system further comprises a data communication connection coupling the first communication module to the second communication module; and when the priority data link is the one of the one or more second module wireless data links, the one or more on-aircraft communication networks are coupled to the second communication module via the data communication connection. In these and other embodiments: the communication system further comprises a link status connection coupled between the connection manager and at least one of the one or more connection detectors configured to determine the availability of the one or more second module wireless data links; the at least one of the one or more connection detectors configured to determine the availability of the one or more second module wireless data links provides a link status available signal to the connection manager via the link status connection when at least one of the one or more second module wireless data links is determined to be available; and the connection manager causes the one or more on-aircraft communication networks to be coupled to the second communication module via the data communication connection in response to the link status available signal received via the link status connection.

Examples include a method for controlling wireless communication between one or more on-aircraft communication networks, including a wireless cabin communication network, and a plurality of external communication networks by first and second communication modules. The first communication module establishes wireless communication with one or more of the external communication networks via one or more first module data links, and the second communication module establishes wireless communication with one or more of the external communication networks via one or more second module data links. The method comprises determining availability of the one or more first module data links and the one or more second module data links; determining a priority data link of the available one or more first module data links and the available one or more second module data links based upon a prioritization scheme; causing the first communication module to couple one or more of the on-aircraft communication networks to one of the external communication networks via the priority data link when the priority data link is one of the first module data links; and causing the second communication module to couple one or more of the on-aircraft communication networks to one of the external communication networks via the priority data link when the priority data link is one of the second module data links.

In some embodiments, the method is performed by an electronic control system that is a component of one of the first and second communication modules. In some embodiments, the method is performed by an electronic control system that is a component of the first communication module. FIG. 6, for example, illustrates an embodiment of the air-to-ground internet system module 220 that includes an electronic control system 221.

In some or all embodiments of the method, the first communication module is configured to establish wireless communication with at least a first external communication network; and the second communication module is configured to establish wireless communication with at least a second external communication network that is different than the first external communication network.

In some or all embodiments of the method, the first communication module is coupled to the wireless cabin communication network; the method further comprises providing link status information to the first communication module indicating status of availability of at least one of the second module data links; determining availability of the second module data links includes determining availability based upon the link status information; and causing the second communication module to couple one or more of the on-aircraft communication networks to one of the external communication networks includes (1) causing the wireless cabin communication network to be coupled to the second communication module via the first communication module, and (2) causing the second communication module to couple the wireless cabin communication network to one of the external communication networks via one of the second module data links.

In some or all embodiments of the method, providing the link status information comprises providing the link status information from the second communication module to the first communication module.

In some or all embodiments of the method, the one or more on-aircraft communication networks further comprises an aircraft avionics system. The aircraft avionics system is coupled to both the first and second communication modules; and the method further comprises: causing the first communication module to couple the aircraft avionics system to one of the external communication networks via one of the first module data links when the priority data link is one of the first module data links; and causing the second communication module to couple the aircraft avionics system to one of the external communication networks via one of the second module data links when the priority data link is one of the second module data links.

Examples include an aircraft communication system comprising first and second communication modules. The first communication module is configured to: establish a first wireless data link with a first external communication network off the aircraft; couple one or more on-aircraft communication networks, including a wireless cabin communication network in a cabin of the aircraft, to the first external communication network via the first wireless data link; receive connection status information, wherein the connection status information is representative of availability of the second communication module to establish a second wireless data link with a second external communication network off the aircraft; determine availability of the first and second data links, wherein the availability of the second data link is determined based upon the connection status information; determine a highest priority data link of the first and second data links determined to be available; couple the one or more on-aircraft communication networks to the first external communication network via the first data link when the first data link is the highest priority data link; and couple the one or more on-aircraft communication networks to the second communication module when the second data link is the highest priority data link. The second communication module is coupled to the first communication module, and is configured to establish the second wireless data link, and couple the one or more on-aircraft communication networks to the second external communication network via the second wireless data link, when the second wireless data link is the highest priority data link.

In embodiments of the aircraft communication system the first and second external communication networks are different networks.

In some or all embodiments of the aircraft communication system, the first communication module is configured to establish the first wireless data link with the first external communication network having a first cost basis; and the second communication module is configured to establish the second wireless data link with the second external communication network having a second cost basis, and wherein one of the first and second cost bases is less than the other.

In some or all embodiments of the aircraft communication system, the second communication module is configured to: determine the availability of the second wireless data link; and generate the connection status information based upon the determination of the availability of the second wireless data link.

In some or all embodiments of the aircraft communication system the one or more on-aircraft communication networks further comprises an aircraft avionics system; the first communication module is coupled to the aircraft avionics system, and is configured to establish wireless communication between the aircraft avionics system and the first external communication network via the first wireless data link when the first wireless data link is the highest priority data link; and the second communication module is coupled to the aircraft avionics system, and is configured to establish wireless communication between the aircraft avionics system and the second external communication network via the second wireless data link when the second wireless data link is the highest priority data link.

In some or all embodiments of the aircraft communication system the first communication module is further configured to store a record of priorities of the first and second wireless data links.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The above-mentioned and other features and advantages of this disclosure, and the manner of obtaining them, will become more apparent, and will be better understood by reference to the following description of the exemplary embodiments taken in conjunction with the accompanying drawings, wherein.

Figure 1:
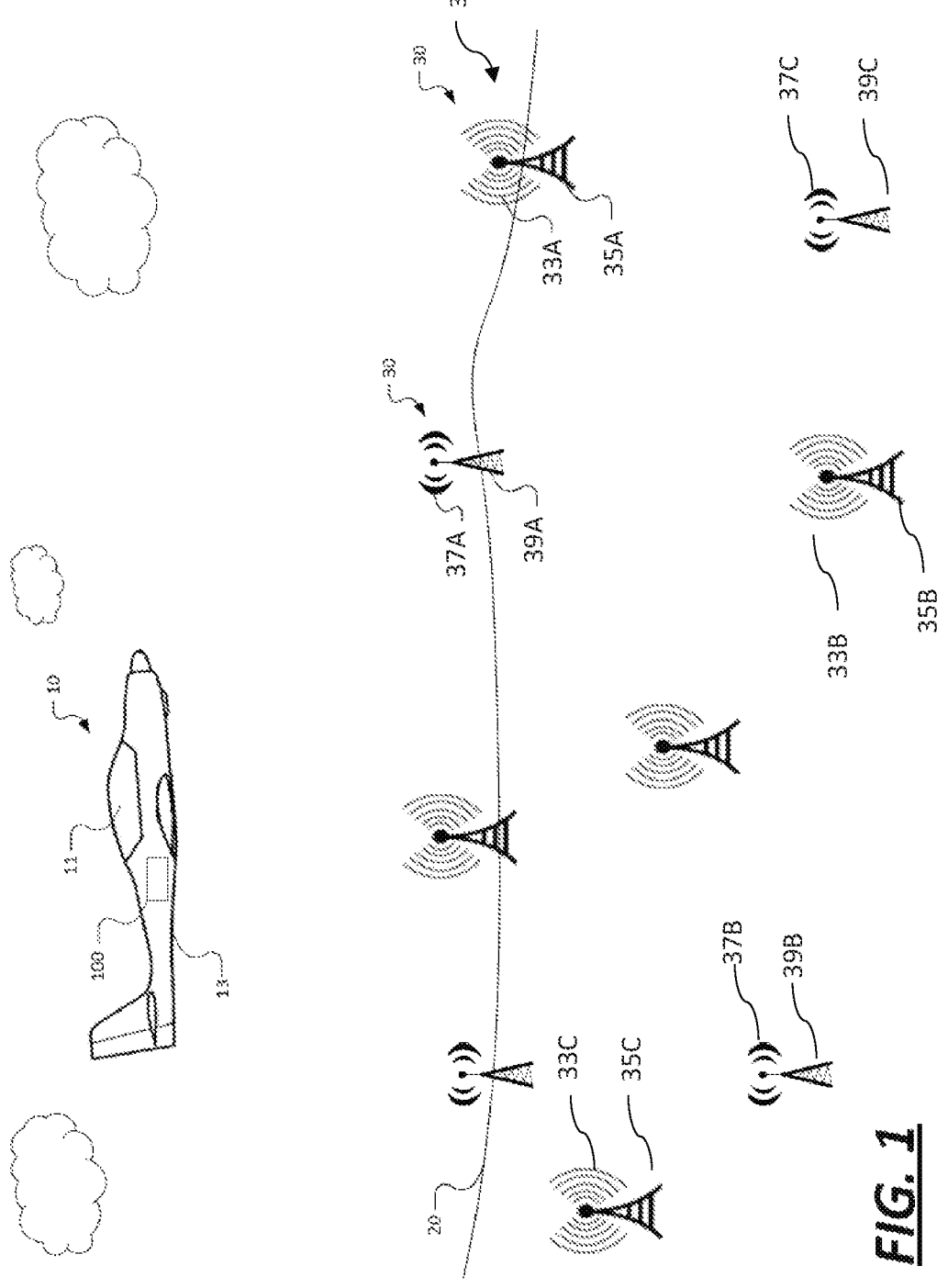
FIG. 1 is a schematic diagram of an inflight aircraft having an aircraft communications architecture, according to principles of the present disclosure.

Corresponding reference characters indicate corresponding parts throughout the several views. Although the drawings represent embodiments of various features and components according to the present disclosure, the drawings are not necessarily to scale and certain features can be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art can utilize their teachings. It is not beyond the scope of this disclosure to have a number (e.g., all) the features in a given embodiment to be used across all embodiments.

As an initial matter, as used herein, data service can refer to high-speed data communications, especially those for in-flight aircraft. Such data services commonly use a series of ground-based transmitters and/or receivers (transceivers) in communication with onboard aircraft antennae, although they should not be limited to these examples. It is contemplated that data services include a series of satellite transceivers in communication with onboard aircraft antenna as well. These examples are just some of many example data services. These data services allow passengers and/or crew on the aircraft and/or the aircraft itself to have high speed data while in flight. In such an arrangement, hardware (e.g., transceivers, antennae, etc.) in an aircraft can be equipped and arranged to provide passengers and/or crew with inflight Internet and other communication channels (e.g., wireless or Wi-Fi) access. Possible communication technologies for providing such wireless communications between the aircraft and systems on the ground may include, for example, commercial 3GPP compliant technology such as 2G, 3G, WiMAX, 4G LTE, 5G and the like or any other wireless technology. Certain hardware may be industrial IEEE 802.11 or 802.16 wireless devices and the like or any other wireless protocol. In various embodiments, IEEE 802.11a, b, g, n, ac or 802.16f, e, m protocols may be used or any other wireless communication protocol. Accordingly, certain hardware may be in communication with multiple wireless access points during flight of the aircraft. Security protocols such as WEP, WPA, WPA2, and 802.11x, IPSEC, TLS, SSL may be used to secure wireless communications. One skilled in the art would appreciate these and related concepts without needing to discuss them here ad nauseum. Further details about principles of the present disclosure are discussed below.

FIG. 1 is a schematic diagram of an in-flight aircraft 10 in an illustrative environment. According to principles of the present disclosure, an aircraft 10 is provided with in-flight wireless data access in its cabin 11. In an implementation employing principles of the present disclosure, an aircraft 10 can include a fuselage 13 that defines the cabin 11. As shown here, the aircraft 10 can be in flight over a terrain 20. The aircraft 10 may also be located on the terrain 20, for example, at an airport. Disposed about the terrain 20 are one or more data services or wireless communication network access points 30 (shown generally by an antenna). The one or more network access points 30 can define interfaces to one or more land-based communication network infrastructures 31 with numerous signal emitting devices, and are shown for example in FIG. 1 as a plurality of cell towers such as 4G, 5G, and high-altitude towers. In other examples of network infrastructure, the communication network access points 30 may be satellite-based to provide wireless communications via satellite signal with numerous air-to-air based transmitters and/or receivers (not shown in FIG. 1). It is also contemplated that any wireless communication technology capable of producing and/or receiving communications via network access points 30 such as those listed, or those well known in the art with enough power to reach an aircraft 10, whether in flight or at a position on the terrain 20 may be used. In some examples, the network infrastructure 31 and associated access points such as 30 may be provided by a one or more data service providers (for example: network providers). These data service providers may apply varying service rates and availability based upon network plans or data service signal frequency for example.

Illustrated here in FIG. 1 is a plurality of network access points 30 such as first network access points 33A-33C provided by transceivers and antennas 35A-35C, respectively, as well as second network access points 37A-37C provided by second transceivers and antennas 39A-39C. In embodiments, the first network access points 33A-33C and associated communication network infrastructure may be provided by a first entity (e.g., to provide data communications via a first off-aircraft communication network), and the second network access points 37A-37C and associated communication network infrastructure may be provided by a second entity (e.g., to provide data communications via a second off-aircraft communication network. In embodiments, the first communication network provided by the first network access points 33A-33C and associated communication network infrastructure may be configured or adapted for a first data service, and the second communication network provided by the second network access points 37A-37C and associated communication network infrastructure may be configured or adapted for a second data service. The first and second data services may be different and configured for different service characteristics. For example, the first communication network provided by first network access points 33A-33C may be configured for data services at a first altitude range, such as for example high-altitude data communication services with commercial passenger aircraft such as 10. Gogo Business Aviation LLC, for example, operates a communication network infrastructure including network access points such as 33A-33C configured to provide wireless data connectivity to devices and communication networks on aircraft such as 10 when in flight. Entities such as Verizon and T-Mobile, for example, operate communication network infrastructure including network access points such as 37A-37C configured to provide data services at a second altitude range that is different than that provided by the first network access points and associated communication network. For example, the second data service may be configured for wireless data connectivity to devices and communication networks on land or other terrestrial settings. Although terrestrial communication access points and network infrastructure may be capable of establishing wireless data communication with devices and networks not physically located on the ground, such as for example with devices and networks in high-rise buildings and relatively low altitude aircraft, such conventional terrestrial communication networks are not configured or specially adapted to provide network communications with devices and networks in aircraft 10 at high altitudes such as for example those used by commercial passenger aircraft. As another example, it is anticipated that network access points and associated communications networks may be capable of providing data services for aircraft at other altitude ranges such as for example those used by drones, helicopters and unmanned aerial vehicles (UAVs) which may be lower than the altitudes of commercial aircraft and higher than the altitudes serviced by networks configured for terrestrial communications.

As described above, the various data communication networks may have different service costs. For example, the first data communication network can have a first service cost (e.g., dollars per unit data used), and the second data communication network can have a second service cost. By way of example, the first service cost can be higher or lower than the second service cost. The aircraft 10 can include aircraft communications architecture 100 that is configured to simultaneously be in communication with the one or more network access points 30 (e.g., with one or more data communication networks). This communication can occur regardless of the service cost for accessing the variety of data communication networks (e.g., because costs may not be incurred until a threshold amount of data is transferred). With the aircraft communications architecture 100 in communication with the one or more network access points 30, a wireless network can be generated e.g., for use on a myriad of devices (e.g., avionics, computers, mobile devices, wearables, and the like) in the cabin 11.

Figure 2:
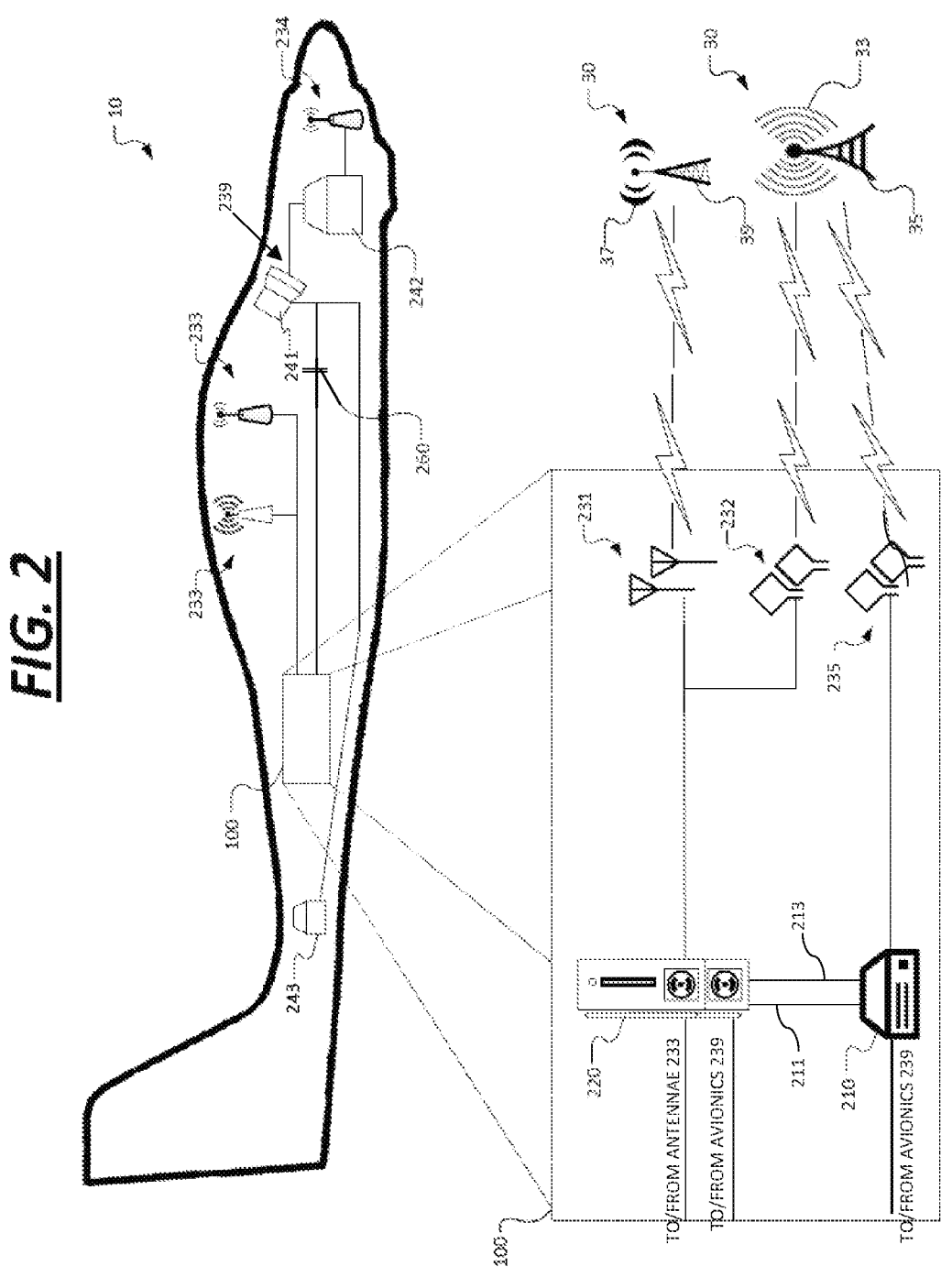
FIG. 2 is a schematic, cutaway view of a cabin in the aircraft of FIG. 1.

FIG. 2 is a schematic, cutaway view of a cabin 11 in the aircraft 10 of FIG. 1 where the aircraft 10 includes an aircraft communications architecture 100. According to principles of the present disclosure, one or more functions and/or one or more components can define the aircraft communications architecture 100 as further discussed below. With respect to functionality, the aircraft communications architecture 100 can be connectible to a wireless data network (e.g., directly or indirectly connected to a wireless router or a switch via wireless or wired connections). The aircraft communications architecture 100 can receive transmissions from one or more available data communication networks or services; select a preferred data communication network of the one or more available data communication networks or services based on one or more criteria; and/or link at least the preferred data communication network or service with an alternate data communication network or service of the one or more available data networks or services to facilitate minimizing service interruptions in the wireless data network while prioritizing the preferred data network or service. The wireless data network can include a passenger network and an aircraft network. The wireless data network can be connectible to communication data streams that include at least two of user data, aircraft control data, aircraft services data, passenger data, aircraft data, avionics data, and in-vehicle systems data.

Performance of the aircraft communications architecture 100 can be governed by algorithms or approaches, such as for example a prioritization scheme, that can reference certain criteria. For instance, the criteria can include one or more (e.g., at least two) of: availability of the one or more data networks; a quantity of the one or more available data networks or services; a quality of the one or more available data networks or services; and a service cost of the one or more available data networks or services. The approaches can include selecting which of the communication data streams to connect to, for instance, for air-to-ground or air-to-air transmission. In examples, the preferred data network or service has the highest quality of the one or more available data networks or services. Quality can be defined considering a variety of factors, including signal strength, available bandwidth, and the like. These are just some examples of the many example criteria disclosed herein or that would be apparent to one skilled in the art. In examples, the preferred data network or service has the lowest service cost of the one or more available services. The approaches can be more complex in certain examples such that two or more criteria are referenced. For instance, as noted above, the one or more available data network or services can include a first data network or service and a second data network or service, and the first data network or service can be different from the second data network or service (e.g., provided by different vendors, having different performance characteristics, and/or having difference cost or other characteristics). In this regard, the first data network or service can have about the same quality as the second data network or service, and the first data network or service can have a lower service cost than the second data network or service. In some such examples, the preferred data network or service is the first data network or service.

In embodiments, the aircraft communications architecture 100 can be configured to facilitate providing in-flight wireless data access to the cabin 11. For instance, the aircraft communications architecture 100 can be configured to obtain flight data that indicates a position (e.g., an altitude of height above ground level (AGL)) of the aircraft 10. It is worth noting that flight data can include data corresponding to service costs (e.g., flight path, altitude, etc.) and other useful data for the aircraft communications architecture 100, such as quality and availability of one or more data services as discussed above. This flight data can be used to determine which of the one or more data network or services is most appropriate for use in the cabin 11 of the aircraft 10. In addition, or in alternative, the aircraft communications architecture 100 can be configured to select a data network or service of the one or more data networks or services based on the service cost associated with using each of the data network or services in the one or more data network or services. In this regard, the aircraft communications architecture 100 can employ logic similar or identical to those discussed elsewhere herein. The aircraft communications architecture 100 can be configured to cause or generate a wireless network in the cabin 11 of the aircraft 10.

Specific but exemplary details about components in the illustrated aircraft communications architecture 100 will now be described with reference to FIG. 2. In examples, the aircraft communications architecture 100 can include one communication module such as telematic control unit or gateway module 210 (e.g., for crash notifications, aircraft tracking, and other data communications (e.g. of aircraft data such as that available from the aircraft avionics communication network or system 239 (e.g., ARINC 429 data available over an ARINC 429 bus) and/or the aircraft engine controller (e.g., RS-422 data) etc.) that is configured to communicate with low-altitude data networks or services, and another communication module such as an air-to-ground internet system module 220 (e.g., Broadband Direct Air to Ground Communications (DA2GC) and the like) that is configured to communicate with at least one high-altitude data network or service, and optionally also with at least one low-altitude data network or service. In embodiments, for example, in addition to the functionality described herein, gateway module 210 may be configured to provide all or portions of the functionality of the gateway described in U.S. Patent Application Publication 2021/0333792, entitled Mobile Device Application-Based Aircraft Data Storage and Communication System published on Oct. 28, 2021, which is hereby incorporated by reference in its entirety and for all purposes. In these and other embodiments, the functionality of the internet system module 220 may be provided by systems such as the AVANCE platform available from Gogo Business Aviation LLC. It is worth noting that the aircraft communications architecture 100 can include SATCOM components for air-to-air communications. The gateway module 210 and the air-to-ground internet system module 220 can be connected directly via one or more links and/or via wireless protocols. In the embodiments shown in FIG. 2, for example, the gateway module 210 and the internet system module 220 are coupled for data communications, for example by an ethernet connection 211, and for certain status or availability information communications (described in greater detail below), for example by a link available discrete connection 213. It should be noted that although shown having a particular arrangement or communication, this disclosure should not be interpreted as limited to this arrangement. One skilled in the art will appreciate that other arrangements, each of which is not shown here for sake of conciseness, that employ principles of the present disclosure are possible and well within the disclosure.

In addition, shown here as in direct or indirect communication with the gateway module 210 and/or the air-to-ground internet system module 220 are a variety of antennae and network architecture. For instance, a first set of antennae 231 coupled to the internet system module 220 can be configured to communicate with high-altitude data networks or services, e.g., from terrestrial 4G or 5G towers. A second set of antennae 232 coupled to the internet system module 220 can be configured to communicate with low-altitude data networks or services, e.g., cell towers optimized for low altitudes. Another set of antennae 235 coupled to the gateway module 210 is configured to communicate with low-altitude data networks or services. A third set of antennae 233 can provide either single-band wireless (e.g., Wi-Fi or other suitable connection) signals or multi-band wireless signals to the cabin 11, and in embodiments is coupled to the internet system module 220. For example, the third set of antennae 233 may include 2.4 GHz WiFi antenna and/or 5 GHz WiFi antennas. In embodiments, the internet system module 220 in connection with the third set of antennae 233 establishes and provides a wireless cabin communication network for communications with wireless devices operated by users within the cabin of the aircraft 10. A fourth set of antennae 234 can provide a secure wireless signal, e.g., to be used for communication among avionics 239. Such avionics 239 can include a cockpit 241, a datalink 242 (e.g., a datalogger and/or Wi-Fi data link) connected to the cockpit 241 and fourth set of antennae 234, and a recoverable data module 243 connected to the cockpit 241. In embodiments, components of the avionics 239 are coupled to one another and to the internet system module 220 via the ARINC 429 bus. A firewall 260 may be erected between the passenger network and the aircraft network such that the aircraft network may be more secure than the passenger network (or vice versa). As shown here, the passenger network can include the aircraft communications architecture 100 and the third set of antennae 233 while the aircraft network can include the cockpit 241, the datalink 242, the fourth set of antennae 234, and the recoverable data module 243.

Figure 3:
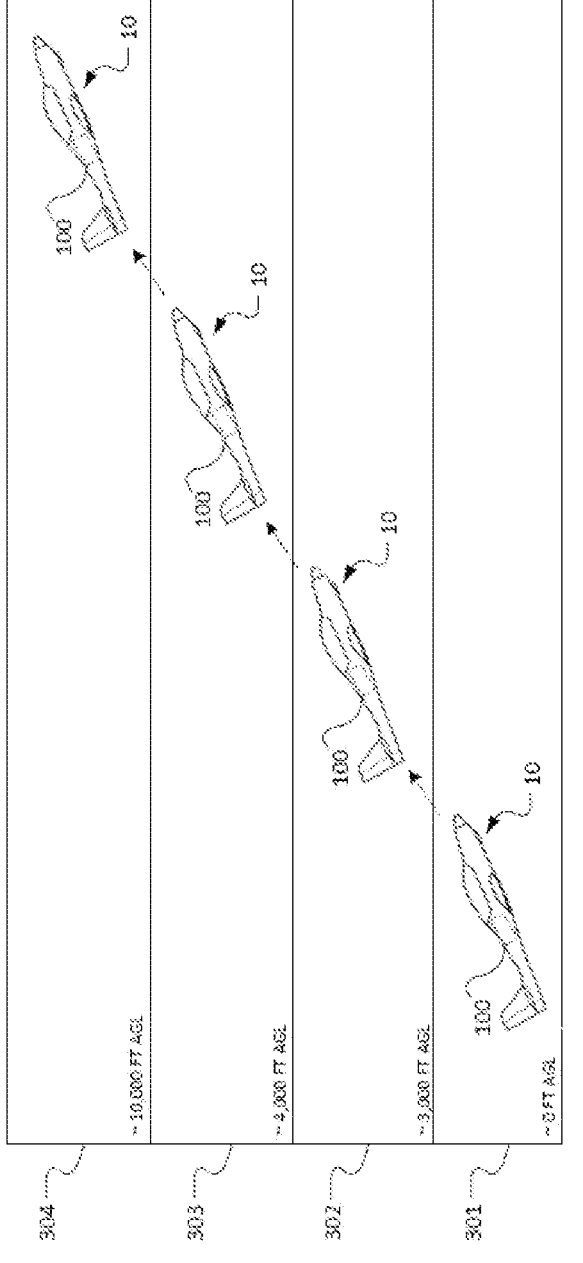
FIG. 3 is a schematic diagram of different bands of AGL associated with certain data services to be accessed by the aircraft communications architecture, according to principles of the present disclosure.

FIG. 3 shows a schematic diagram of different bands of AGL associated with certain data networks and services to be accessed by the aircraft communications architecture 100. As shown here, the aircraft 10 is in ascent and moving through four bands of connectivity as indicated by the dashed arrows. The first band of connectivity 301 is shown between about 0 feet AGL and about 3,000 feet AGL, the second band of connectivity 302 is shown between about 3,000 feet AGL and about 4,000 feet AGL, the third band of connectivity 303 is shown between about 4,000 feet AGL and about 10,000 feet AGL, and the fourth band of connectivity 304 is shown as being above about 10,000 feet AGL. It should be noted that these bands of connectivity may differ across embodiments and the number of bands and their associated AGL will vary across examples depending on the desired types and number of data services. In addition, similar or different arrangements of connectivity bands may be provided for the descent of the aircraft 10 (not shown here). Further it is noted that the connectivity bands may have minimal or significant overlap with one another in relation to the specified AGL it is associated with. These example overlaps may also have areas of increased or decreased signal strengths compared to other segments of the connectivity bands. This disclosure is intended to include all of these variations.

As noted above in the discussion of FIG. 1, here in FIG. 3 the one or more data network or services can include first and second data networks or services (e.g., a high-altitude data network or service and a low-altitude data network or service respectively). In such examples, communicating with the one or more data networks or services can include communicating with a land-based network infrastructure. In examples, communicating with the one or more data networks or services can include communicating with a land-based network infrastructure that comprises a network of air-to-ground cell towers. Of course, as noted elsewhere herein, air-to-air communications are contemplated herein. As noted elsewhere herein, the one or more data networks or services can define a land-based network infrastructure with numerous signal emitting devices, for example a plurality of cell towers such as 4G, 5G, and high-altitude towers. In other examples of network infrastructure, the data networks or services may be produced via satellite signal with numerous air-to-air based transmitters. It is also contemplated that any data networks or services signal, such as those listed, or those well known in the art with enough power to effectively communicate with an aircraft, whether in flight or at a position on the terrain may be used. In examples, the networks or services may be associated with separate service providers, each of the service providers may have different costs associated with different data network or service signals.

A prioritization scheme can govern behavior of the aircraft communications architecture 100 as the position of the aircraft 10 and/or service costs of available data services change during flight or on the ground. This scheme can operate similar to other schemes discussed elsewhere herein. For instance, the first service cost can be higher than the second service cost with a similar quality for both data services. Under these circumstances, the aircraft communications architecture 100 can be configured to prioritize selecting the relatively lower-cost second data network or service over the relatively higher cost first data network or service if both the first and second data networks are available.

Figure 4:
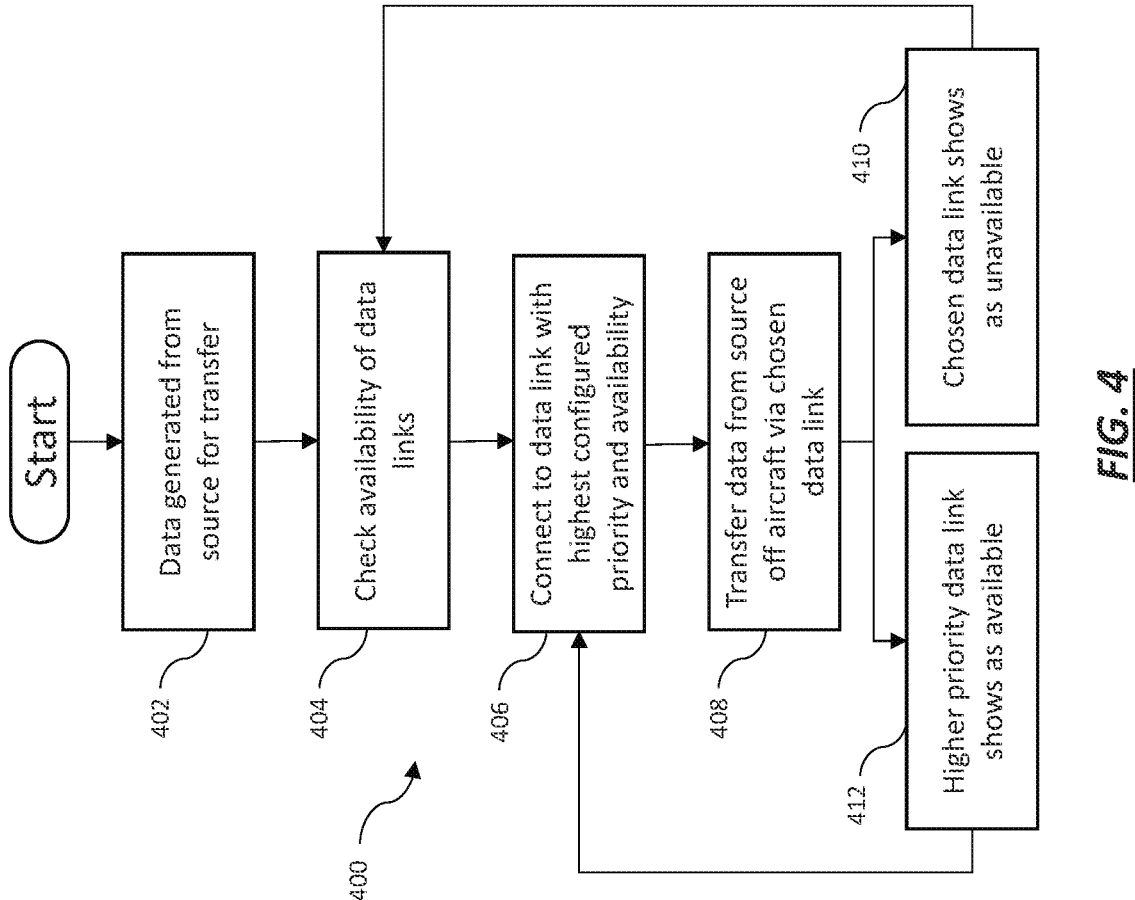
FIG. 4 is a flowchart of a method for coupling data between an aircraft and a plurality of off-aircraft communication networks, according to principles of the present disclosure.

Also disclosed herein are methods 400 of providing in-flight wireless data access in a cabin of an aircraft 10 as shown in the flowchart of FIG. 4, which can be described with reference to FIG. 2. As shown at step 402, method 400 can include generating or receiving data from a source on the aircraft 10 that is to be transferred to a communication network off the aircraft. For example, the data may be received from or generated by the wireless network 11 of the aircraft 10 and/or the avionics 239. The availability of one or more data links is checked or determined as shown at step 404. For example, the availability of data links with communication networks associated with one or more of the first network access points 33 and/or the second network access points 37 may be determined. In embodiments described in greater detail below, the availability of data links may be determined at step 404 by one or both of the gateway module 210 or the internet system module 210. At step 406, a data link is established with the highest priority data link that was determined to be available at step 404. In connection with step 406, a data structure identifying the one or more data links that the aircraft 10 is configured to use, and the prioritization scheme associated with the data links may be maintained. For example, the data structure may maintain the priorities as a sequential order from a highest (e.g. most preferred) priority to a lowest (e.g., least preferred) priority. Any or all criteria of the types described herein may be used as bases for establishing the prioritization scheme. As described in greater detail below, the data link may be established by one of the gateway module 210 or the internet system module at step 406.

As shown by step 408, following the establishment of the data link at step 406, the data from the aircraft 10 may be transferred via the data link from the aircraft to the communication network associated with the data link. Similarly, and because of the establishment of the data link between the aircraft 10 and the off-aircraft communication network, data may be transferred to the aircraft from the data network via the established data link. Status of the data link (e.g., continued availability, or availability of a higher priority data link) used at step 408 may be monitored. If the established data link being used at step 408 is determined to be unavailable, steps of method 400, such as those starting at step 404, may be repeated as shown by step 410. If a higher priority data link becomes available, steps of method 400, such as those starting at step 406, may be repeated as shown by step 412.

Figure 5:
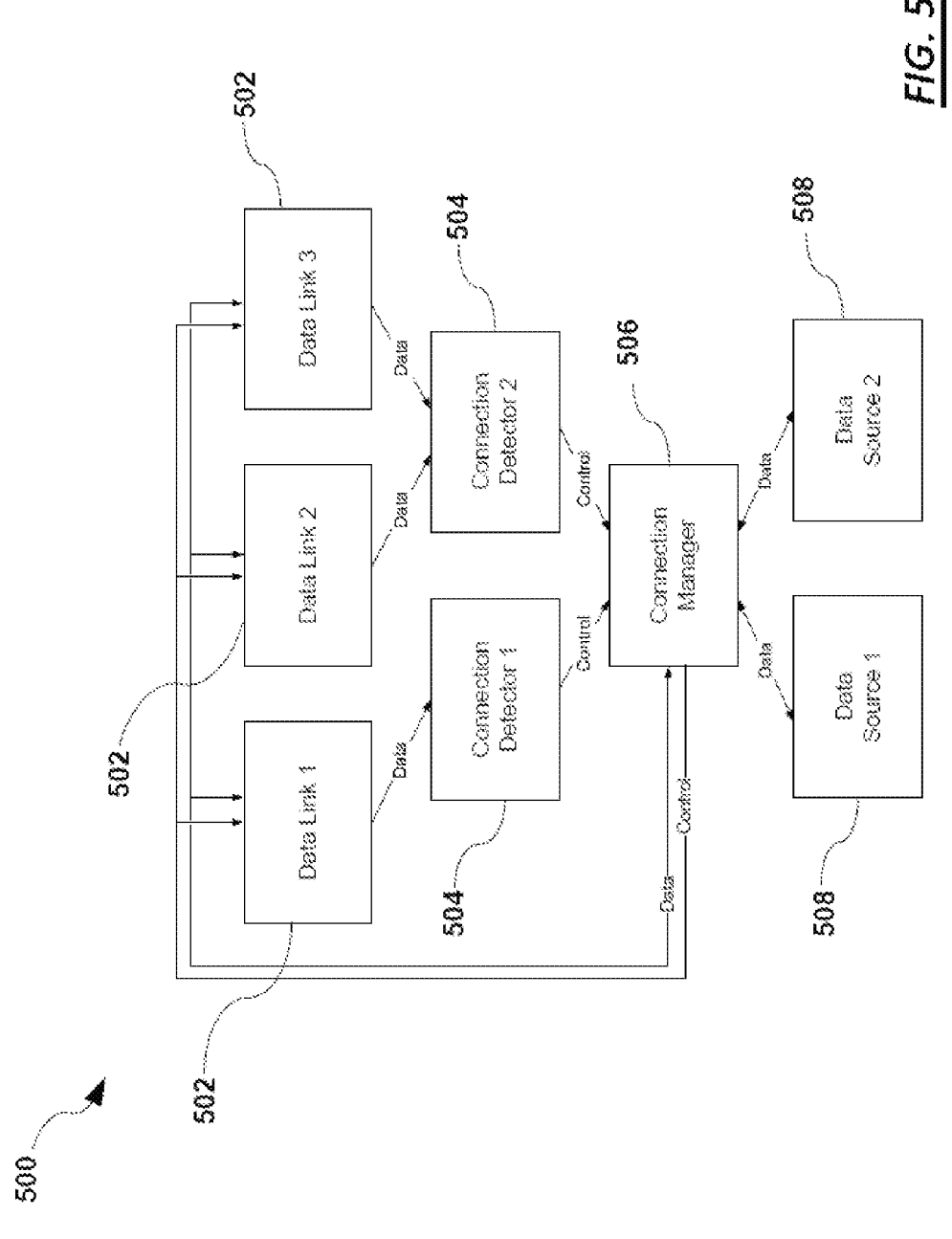
FIG. 5 is a schematic diagram of a system according to aspects of the present disclosure.
Figure 6:
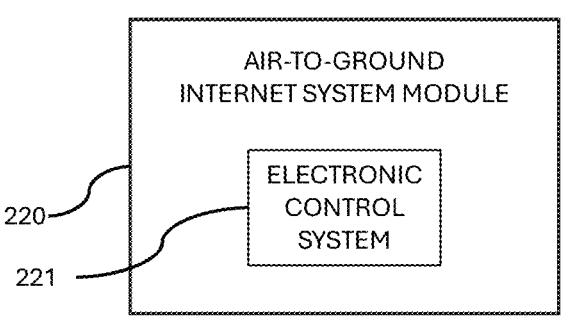
FIG. 6 is a diagrammatic illustration of an air-to-ground internet system module, in accordance with embodiments.

FIG. 5 is a diagrammatic illustration of a system 500 showing a functional diagram according to principles of the present disclosure. Such a system 500 of one or more computers and/or components can be configured to perform particular operations or actions by virtue of having software, firmware, hardware, or a combination of them installed on the system 500 that in operation causes or cause the system 500 to perform the actions (e.g., the methods such as 400 described herein). One or more computer programs can be configured to perform particular operations or actions by virtue of including instructions that, when executed by data processing apparatus, cause the apparatus to perform the actions. In this regard, whether in flight, on the ground, or both, the system 500 can function similarly to those aircraft communications architectures discussed elsewhere herein. Communications within the system 500 are indicated by arrows, namely "Data" and "Control" arrows. In particular, the Data arrows indicate information for internal/external transfer or about a system component state. The Control arrows indicate activation, deactivation, and/or availability of a data link 502 for use in data transfer. Data links 502 effectively correspond to the different data transfer modalities of the aircraft communications architecture 100 that operate to communicate with different off-aircraft data networks or services as described herein. For example, the Data Link 1 may be air-to-ground communication network functionality provided by the internet system module 220 in connection with the antenna 231. The Data Link 2 and Data Link 3 may be "terrestrial" communication network functionalities such as ground LTE operations and airborne LTE operations functionalities provided by the gateway module 210 in connection with antenna 235. Although shown diagrammatically by common lines in FIG. 5 for purposes of example (e.g., a shared bus), separate connections can be provided between the connection manager 506 and each of the data links 502 (e.g., by a star topology).

System components can be physically independent and/or combined into a single LRU, circuit card, or program, for example. In implementations, the system 500 includes one or more of the following components. The system 500 can include a Data Link 502 that is a wired or wireless data transfer unit, a plurality of which can be differentiated by a unique protocol, frequency, or service plan. The system 500 can include one or more Connection Detectors 504, each of which determines if an individual data link 502 is available as a data routing option (e.g., whether the aircraft communications architecture 100 can establish an operational communication channel with one or more of the off-aircraft data networks or services, such as for example with the first data network or service or with the second data network or service). In embodiments, the functionality of the connection detector 504 may be incorporated into one or both of the gateway module 210 or the internet system module 220.

The system 500 can include a Connection Manager 506 that routes data through a prioritization scheme to some or all data links 502. Examples of parameters or bases that may be used in connection with the prioritization scheme can include service cost and/or other criteria such as availability. The system 500 can include on-aircraft Data Sources 508 that generates data and/or receives end-point data. Examples of data sources 508 include personal electronic devices and LRUs, the WiFi or other passenger cabin network, avionics or other information on the ARINC 429 bus and/or engine controller or other information on the RS-422 bus. Although depicted as having certain quantities and/or communications, it should be appreciated that these features may vary without departing from the scope of this disclosure.

In embodiments, the connection manager 506 processes the information received from the connection detector 1 and/or the connection detector 2 based on the prioritization, and generates control signals causing selected data links 502 (e.g., data link 1, data link 2 and/or data link 3) to establish communications between the associated data network or service and data source such as data source 1 and/or data source 2. In embodiments, for example, the connection manager may include a prioritization scheme that causes a data source 508 to be to be coupled to the first data network (e.g., the high-altitude data service) via antenna 231, or to the second data network (e.g., the low-altitude data service) via the antenna 232. In embodiments, the functionality of the connection manager 506 may be implemented by the gateway module 210 and/or the internet system module 220.

In embodiments, the internet system module 220 is configured to provide the functionality of the connection manager 506. For example, if the gateway module 210 (e.g., via the connection detector 2 in FIG. 5) determines availability of an off-aircraft data network or service through which the gateway module 210 is configured to establish communications, the gateway module 210 may provide information representative of that gateway-accessible off-aircraft network availability to the internet system module 220. In embodiments, the gateway module 210 is configured to provide information representative of gateway-accessible off-aircraft network availability, for example a status signal, via the link available discrete connection 213 shown in FIG. 5. In embodiments, the internet system module 220 is configured to route data between the on-aircraft data sources such as data sources 508 and the gateway module 210 via the ethernet connection 211. By this approach, when the gateway module 210 is capable of establishing communications with an off-aircraft data network or service, on-aircraft data sources may be coupled to the off-aircraft data network or service by the gateway module via the internet system module 220.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

What is claimed is:

1. An aircraft communication system comprising first and second communication modules, wherein:
   the first communication module is configured to:
       establish a first wireless data link with a first external communication network off the aircraft;
       receive connection status information, wherein the connection status information is representative of availability of the second communication module to establish a second wireless data link with a second external communication network off the aircraft;

determine availability of the first and second data links, wherein the availability of the second data link is determined based upon the connection status information;
       determine a highest priority data link of the first and second data links determined to be available;
       couple one or more on-aircraft communication networks, including a wireless cabin communication network in a cabin of the aircraft, to the first external communication network via the first data link when the first data link is the highest priority data link; and
       couple the one or more on-aircraft communication networks from the first communication module to the second communication module when the second data link is the highest priority data link; and
   the second communication module is coupled to the first communication module, and is configured to:
       establish the second wireless data link, and couple the one or more on-aircraft communication networks to the second external communication network via the second wireless data link, when the second wireless data link is the highest priority data link.

2. The aircraft communication system of claim 1, wherein the first and second external communication networks are different networks.

3. The aircraft communication system of claim 1, wherein:
   the first communication module is configured to establish the first wireless data link with the first external communication network having a first cost basis; and
   the second communication module is configured to establish the second wireless data link with the second external communication network having a second cost basis, and wherein one of the first and second cost bases is less than the other.

4. The aircraft communication system of claim 1, wherein the second communication module is configured to:
   determine the availability of the second wireless data link; and
   generate the connection status information based upon the determination of the availability of the second wireless data link.

5. The aircraft communication system of claim 1, wherein:
   the one or more on-aircraft communication networks further comprises an aircraft avionics system;
   the first communication module is coupled to the aircraft avionics system, and is configured to establish wireless communication between the aircraft avionics system and the first external communication network via the first wireless data link when the first wireless data link is the highest priority data link; and
   the second communication module is coupled to the aircraft avionics system, and is configured to establish wireless communication between the aircraft avionics system and the second external communication network via the second wireless data link when the second wireless data link is the highest priority data link.

6. The aircraft communication system of claim 1, wherein the first communication module is further configured to store a record of priorities of the first and second wireless data links.

7. An aircraft communication system for use in an aircraft including one or more on-aircraft communication networks, comprising:
   a first communication module configured to establish communication with one or more external communication networks off the aircraft via one or more first module wireless data links; and a second communication module configured to establish communication with one or more external communication networks off the aircraft via one or more second module wireless data links;

one or more connection detectors configured to determine availability of the one or more first module wireless data links and availability of the one or more second module wireless data links; and a connection manager configured to:

store prioritization information associated with the one or more first module wireless data links and the one or more second module wireless data links;

determine a priority data link of the available one or more first module wireless data links and the available one or more second module wireless data links based upon the prioritization information;

when the priority data link is one of the one or more first module wireless data links, cause the first communication module to couple the one or more on-aircraft communication networks, via the priority data link of the first module wireless data links, to an associated external communication network; and when the priority data link is one of the one or more second module wireless data links, cause the second communication module to couple the one or more on-aircraft communication networks, via the priority data link of the second module wireless data links, to an associated external communication network; and wherein:

the one or more on-aircraft communication networks is coupled to the first communication module;

the communication system further comprises a data communication connection coupling the first communication module to the second communication module; and when the priority data link is the one of the one or more second module wireless data links, the one or more on-aircraft communication networks are coupled to the second communication module via the data communication connection.

8. The aircraft communication system of claim 7, wherein:

at least one of the one or more first module data links is configured to establish wireless communication with a first external communication network; and at least one of the one or more second module data links is configured to establish wireless communication with a second external communication network, and wherein the second external communication network is different than the first external communication network.

9. The aircraft communication system of claim 7, wherein:

the first communication module is configured to establish wireless communication with a first external communication network having a first cost basis; and the second communication module is configured to establish wireless communication with a second external communication network having a second cost basis, and wherein one of the first and second cost bases is less than the other.

10. The aircraft communication system of claim 7, wherein:

the communication system further comprises a link status connection coupled between the connection manager and at least one of the one or more connection detectors configured to determine the availability of the one or more second module wireless data links;

the at least one of the one or more connection detectors configured to determine the availability of the one or more second module wireless data links provides a link status available signal to the connection manager via the link status connection when at least one of the one or more second module wireless data links is determined to be available; and the connection manager causes the one or more on-aircraft communication networks to be coupled to the second communication module via the data communication connection in response to the link status available signal received via the link status connection.

11. A method for controlling wireless communication between one or more on-aircraft communication networks, including a wireless cabin communication network, and a plurality of external communication networks by first and second communication modules, wherein the first communication module establishes wireless communication with one or more of the external communication networks via one or more first module data links, and the second communication module establishes wireless communication with one or more of the external communication networks via one or more second module data links, comprising:

determining availability of the one or more first module data links and the one or more second module data links;

determining a priority data link of the available one or more first module data links and the available one or more second module data links based upon a prioritization scheme;

causing the first communication module to couple one or more of the on-aircraft communication networks to one of the external communication networks via the priority data link when the priority data link is one of the first module data links; and causing the second communication module to couple one or more of the on-aircraft communication networks to one of the external communication networks via the priority data link when the priority data link is one of the second module data links;

wherein:

the first communication module is coupled to the wireless cabin communication network;

the method further comprises providing link status information to the first communication module indicating status of availability of at least one of the second module data links;

determining availability of the second module data links includes determining availability based upon the link status information; and causing the second communication module to couple one or more of the on-aircraft communication networks to one of the external communication networks includes (1) causing the wireless cabin communication network to be coupled to the second communication module via the first communication module, and (2) causing the second communication module to couple the wireless cabin communication network to one of the external communication networks via one of the second module data links.

12. The method of claim 11, wherein the method is performed by an electronic control system that is a component of one of the first and second communication modules.

13. The method of claim 11 wherein the method is performed by an electronic control system that is a component of the first communication module.

14. The method of claim 11, wherein:

the first communication module is configured to establish wireless communication with at least a first external communication network; and the second communication module is configured to establish wireless communication with at least a second external communication network that is different than the first external communication network.

15. The method of claim 11, wherein providing the link status information comprises providing the link status information from the second communication module to the first communication module.

16. The method of claim 11, wherein:

the one or more on-aircraft communication networks further comprises an aircraft avionics system, and wherein the aircraft avionics system is coupled to both the first and second communication modules; and the method further comprises:

causing the first communication module to couple the aircraft avionics system to one of the external communication networks via one of the first module data links when the priority data link is one of the first module data links; and causing the second communication module to couple the aircraft avionics system to one of the external communication networks via one of the second module data links when the priority data link is one of the second module data links.

\*    \*    \*    \*    \*